United States Patent [19]

Magnusson

[11] Patent Number: 4,872,495
[45] Date of Patent: Oct. 10, 1989

[54] TOOL FOR ROTATION RING TYPE BARKING MACHINES

[75] Inventor: Lennart Magnusson, Iggesund, Sweden

[73] Assignee: Mecanas AB, Hudiksvall, Sweden

[21] Appl. No.: 263,524

[22] Filed: Oct. 27, 1988

[30] Foreign Application Priority Data

Jun. 8, 1988 [SE] Sweden .............................. 8802141

[51] Int. Cl.[4] .............................................. B27L 1/00
[52] U.S. Cl. .............................. 144/208 E; 144/208 R; 144/241
[58] Field of Search ............... 144/208 R, 208 E, 240, 144/241, 2 Z, 341

[56] References Cited

U.S. PATENT DOCUMENTS 3,973,607  8/1976  Jonsson ................................ 144/241
4,231,406  11/1980  Jonsson ................................ 144/241

FOREIGN PATENT DOCUMENTS 415078  9/1980  Sweden .
77128023  11/1983  Sweden .

Primary Examiner—W. Donald Bray
Attorney, Agent, or Firm—McFadden, Fincham, Marcus & Allen

[57] ABSTRACT

A tool for rotation ring type barking machines comprises a swinging arm which is connected at one end via a screw connection with a holder on a shaft rotatably mounted in the rotor of the machine. The holder has two elongated grooves spaced apart by an intermediate ridge and adapted to accommodate two spaced-apart beads formed on the swinging arm. The two outer lateral faces defining the grooves are sloping in cross-section and converge toward one another at an angle slightly less than a corresponding angle of convergence between the outer lateral faces defining said beads. Also the inner lateral faces of said beads and said ridge are sloping, and upon tightening of the screw connection at issue the beads are urged into the two grooves, the difference between said angles of convergence being gradually reduced toward zero until the inner bead faces come into contact with the lateral faces of the ridge, at which point the screw has been tightened with sufficient tensioning force.

8 Claims, 2 Drawing Sheets

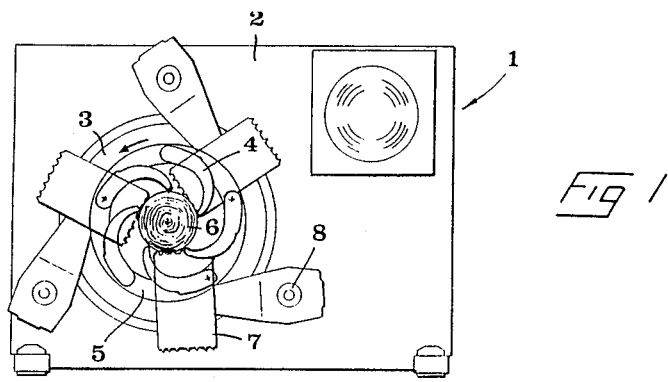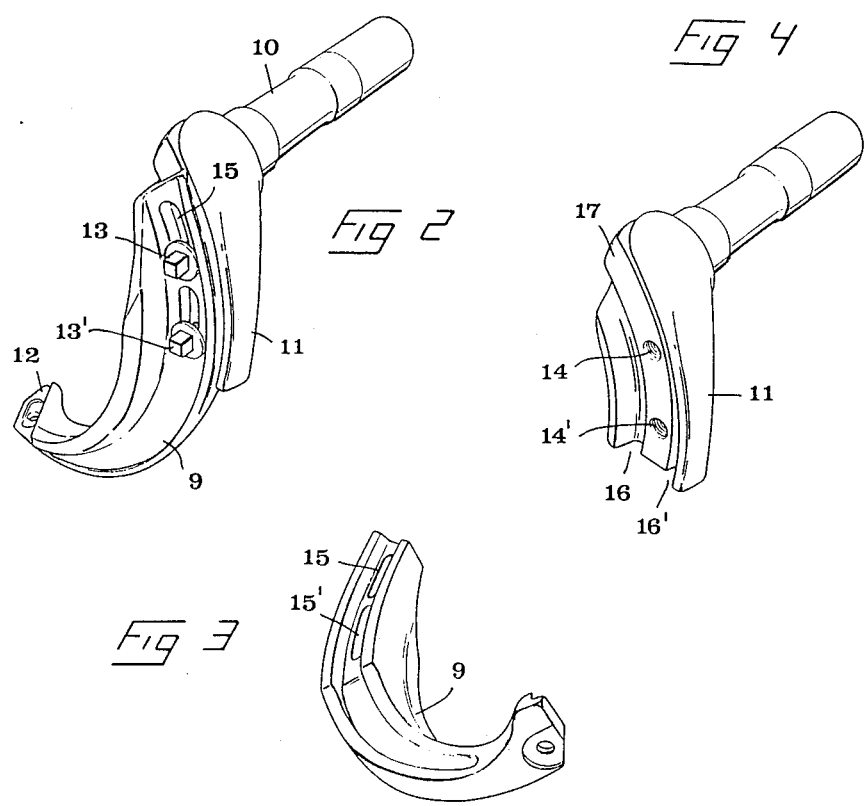

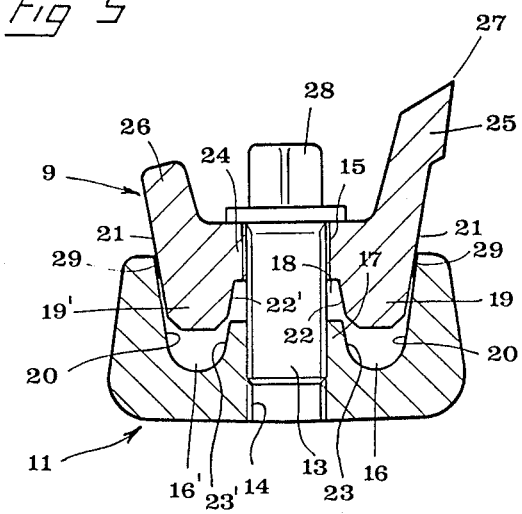
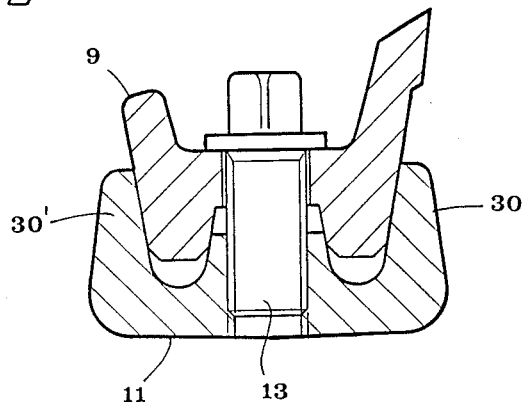

4,872,495

TOOL FOR ROTATION RING TYPE BARKING MACHINES

TECHNICAL FIELD OF THE INVENTION

The present invention relates to a tool for rotation ring type barking machines, comprising a curved swinging arm which is adapted to carry at a first, free end a cutting edge and which is detachably connected at its opposite end by means of a screw connection with a shaft rotatably mounted in the rotor of the machine, more particularly via a holder which is preferably made in one piece with the shaft and extends at an angle relative to said shaft.

BACKGROUND OF THE INVENTION

In prior art barking tools, for example of the type described in Swedish Patent Specification 7712802-3, the screw connection between the pivot shaft and the holder frequently causes trouble. During operation, the swinging arms of the machine are under severe strain in the form of violent jolts, not only when the leading end of a log fed into the machine bumps against the arms to open them, but also when the arms after barking leave the trailing log end and are quickly swung back into their central initial positions. Unless the screws of the connection have been tightened with a specific and relatively large tensioning force, they will sooner or later work loose in their threaded holes, and the result is that also the swinging arm will sit loose on its holder and rattle. Furthermore, the lost gripping power of the screw detracts from the barking efficiency. In more serious cases, the arm may even break loose from the holder, with serious consequences to those standing around.

Brief description of the inventive concept

The present invention aims at solving the above problem and at providing a tool on which the screw connection between the swinging arm and the holder functions reliably for a long time. According to the principal features of the invention, this is achieved in that either the holder or the swinging arm, preferably the former, has two elongated, preferably curved grooves spaced apart by an intermediate ridge and adapted to accommodate two beads formed on the swinging arm or the holder, respectively, and spaced apart by an intermediate recess; that the two lateral faces defining the said grooves are sloping in cross-section and converge toward one another at an angle slightly less than a corresponding angle of convergence between the outer lateral faces defining said beads; and that also the inner lateral faces of said beads and said ridge are sloping, such that said beads, upon tightening of the screw at issue, are urged into the two grooves, the difference between said angles of convergence being gradually reduced toward zero until the inner bead faces come into contact with the lateral faces of the ridge, at which point the screw has been tightened with sufficient tensioning force.

BRIEF DESCRIPTION OF THE ACCOMPANYING DRAWINGS

In the drawings
FIG. 1 is a schematic front view of a rotation ring type barking machine;

FIG. 2 is an enlarged perspective view of a tool according to the invention, included in the machine;

FIG. 3 is a perspective view of a swinging arm included in the tool as shown in FIG. 2;

FIG. 4 is a perspective view of a pivot shaft included in the tool, and the holder associated therewith;

FIG. 5 is a cross-sectional view of the tool in the assembled state, the screw connection being but partly screwed in, and FIG. 6 is the same cross-sectional view as in FIG. 5, but with the screw connection fully tightened.

DETAILED DESCRIPTION OF A PREFERRED EMBODIMENT OF THE INVENTION

Reference numeral 1 in FIG. 1 generally designates a barking machine which includes, besides a supporting frame or housing 2, a rotor 3 on which a number of tools 4 according to the invention are mounted. The embodiment illustrated comprises five tools, but this number may vary. The rotor 3 is annular, and through the hollow space 5 thereof a log 6 can be fed lengthwise by means of a suitable number of rotating rolls 7, for example three rolls which preferably are in the form of jagged rolls pivotally mounted in journals 8. It is pointed out that the jagged rolls 7 are distinctly separate from the rotor 3 in a direction perpendicular to the plane of the drawing so that the rolls will not come into contact with the rotor. It is also pointed out that a corresponding set of feed rolls are mounted on the rear side of the housing 2, such that a log can be fed before a log end has entered into contact with the tools, or discharged after a log end has lost contact with the tools.

The tool illustrated in FIGS. 2-6 comprises the actual swinging arm 9 and a shaft 10 which is journaled in the rotor 3 and which at its end protruding from the rotor has a holder 11. The holder 11 preferably is formed in one piece with the shaft 10, but may also be designed as a separate part which subsequently is firmly connected with the shaft 10. The swinging arm 9 is curved and has at its free end remote from the holder 11 a seat 12 adapted to accommodate a detachable cutting tool (not shown) which incorporates the cutting edge performing the actual barking operation. Instead of using a separate exchangeable cutting tool, it is also possible to form the cutting edge directly on the pivot shaft proper.

As will appear from FIGS. 2-6, the swinging arm 9 is detachably connected with the holder 11 via a screw connection which, in the embodiment illustrated, comprises two screws 13, 13' which are in engagement with threaded holes 14, 14' in the holder 11 and extend through oblong holes 15, 15' in the arm 9.

In accordance with the principle of the invention, the holder 11 is formed with two elongated grooves 16, 16' which, in the embodiment illustrated, are curved and spaced apart by an intermediate ridge 17. These grooves are adapted to receive two beads 19, 19' formed on the swinging arm 9 and spaced apart by an intermediate recess 18. The two outer lateral faces 20, 20' defining the grooves 16, 16' are sloping in cross-section and converge toward one another in a direction toward the bottoms of the grooves at an angle slightly less than a corresponding angle of convergence between the outer lateral faces 21, 21' defining the beads 19, 19' and extending upwardly along the sides of the swinging arm all the way from the beads to the upper side of the swinging arm. Also the inner lateral faces 22, 22' defining the beads 19, 19' are sloping, but converge upwardly toward the upper side of the swinging arm. These surfaces correspond to similarly sloping and upwardly converging inner lateral faces 23, 23' which together with the outer faces 20, 20' define the grooves 16, 16'.

The two bead portions 19, 19' of the swinging arm are mutually connected by a relatively thin web portion 24. It is pointed out that the side of the swinging arm 9 first struck by a log fed into the machine has a flange 25 which is slightly higher than a similar flange 26 on the opposite side of the arm and formed with a relatively sharp edge 27. The threaded holes 14, 14' are located in the ridge portion 17 of the holder 11, while the oblong holes 15, 15' through which the screw shanks extend, are positioned in the web portion 24 of the swinging arm. The screw heads 28 may conveniently be in the form of square heads which are not notably higher than the lowest lateral flange 26 of the swinging arm, whereby the heads are accommodated by the protected space between the flanges 25 and 26.

It is also pointed out that not only the grooves 16, 16' and the beads 19, 19', but also the oblong holes 15 are circularly curved, whereby the swinging arm can be displaced along a part-circular path relative to the holder. The displaceability makes it possible to adjust the swinging arm into different selectable positions relative to the holder for variation of the distance between the center of gravity of the swinging arm and the center of the pivot shaft 10.

In FIG. 5, the screw 15 has been initially screwed into the threaded hole 14 but not finally tightened. In this condition, the outer sloping lateral faces 21, 21' of the swinging arm are in contact with the corresponding lateral faces 20, 20' of the holder 11 only in the upper edge area 29, in that the angle of convergence between the lateral faces 21 and 21' is somewhat greater than the angle of convergence between the faces 20 and 20'. In the condition illustrated in FIG. 5, the inner faces 22, 22' of the beads 19, 19' furthermore are clearly removed from the inner lateral faces 23, 23' of the grooves 16, 16'.

When the two screws 15, 15' are tightened to the condition shown in FIG. 6, the beads 19, 19' are urged downwardly towards the bottoms of the grooves 16, 16', the initial difference between the angle of convergence between the faces 21, 21' and the angle of convergence between the faces 20, 20' being gradually reduced toward zero according as the screws are tightened. Tightening and the gradual reduction of the angular difference can continue only until the inner faces 22, 22' of the beads encounter the lateral faces of the ridge 17. At this point, the swinging arm is stopped by the holder, and the torque required for pushing the swinging arm further inwardly relative to the holder is increased drastically. This torque is equivalent to the tensioning force with which the screws must be tightened to gain adequate gripping power for a long time. In this manner, there is conveniently obtained a specific and adequate tensioning force in the screw connection.

The above-mentioned reduction of the angular difference between the faces 20—20' and 21—21' is achieved by a partial deformation of the material of both the swinging arm and the holder, more particularly in the lateral flanges 30, 30' of the holder and the relatively thin web portion 24 of the swinging arm.

In the embodiment described above, the grooves 16 are formed in the holder 11 and the beads 19 in the swinging arm 19. However, the reverse is also possible, i.e. the grooves are formed in the swinging arm and the beads in the holder. The important thing is that the essentially W-shaped cross-sections of the two elements are maintained and made to cooperate in the manner described.

What I claim and desire to secure by Letters Patent is:

1. A tool for a rotation ring type barking machine, comprising
    a curved arm having a free end adapted to mount a cutting edge; and
    detachable mounting means at the other end of said curved arm for mounting said arm to a holder;
    said detachable mounting means comprising a first pair of cooperating means associated with said curved arm and a second pair of cooperating means associated with said holder;
    one of said pairs of cooperating means comprising a pair of elongated grooves spaced apart by an intermediate ridge, the other of said pair of cooperating means comprising a pair of elongated beads spaced apart by an intermediate recess with said beads being adapted to engage in said grooves;
    said grooves each having converging side surfaces inclined upwardly and outwardly from a base of the groove;
    said beads each having converging side surfaces inclined outwardly from a base of said bead;
    the convergence of said side surfaces of said grooves forms an angle which is slightly less than an angle formed by the convergence of said side surfaces of said beads; and
    fastening means for releasably fastening said arm to said holder;
    whereby tightening of said fastening means forces said beads into said grooves to thereby reduce the difference between said angles to a 0 angle upon said tightening.

2. A tool as claimed in claim 1, said intermediate recess having a relatively thin central web with at least one aperture in said central web, at least one aperture in said intermediate ridge, said fastening means comprising screw means passing through said aperture of said central web into said aperture in said intermediate ridge.

3. A tool as claimed in claim 2, wherein said grooves and said beads each have a circularly curved configuration, said arm being selectively mountable relative to said holder to permit variation of the distance between the center of a pivot shaft on which said holder is adapted to be mounted and the center of gravity of said arm.

4. A tool as claimed in claim 1, wherein said grooves are formed in said holder and said beads are formed on said arm.

5. A tool as claimed in claim 3, wherein said at least one aperture in said central web comprises an elongated aperture.

6. A tool as claimed in claim 3, wherein said holder includes a shaft, said holder and said shaft being of a one-piece construction.

7. A tool as claimed in claim 1 wherein said grooves are formed in said arm and said beads are formed on said holder.

8. A tool as claimed in claim 6, wherein said holder is angularly displaced relative to said shaft.

* * * * *

UNITED STATES PATENT AND TRADEMARK OFFICE
CERTIFICATE OF CORRECTION

PATENT NO. : 4,872,495
DATED : October 10, 1989
INVENTOR(S) : Lennart Magnusson

It is certified that error appears in the above-identified patent and that said Letters Patent is hereby corrected as shown below:

On the cover page, item [73] the name of the Assignee has been corrected from "Mecanas AB" to --Mecania AB--.

Signed and Sealed this

Ninth Day of October, 1990

*Attest:*

HARRY F. MANBECK, JR.

*Attesting Officer*      *Commissioner of Patents and Trademarks*